United States Patent [19]

Sargunar

[11] 3,938,193
[45] Feb. 10, 1976

[54] MAGNETIC TRANSDUCER HEAD HAVING AN INTEGRAL MAGNETIC SHIELD AND WEAR INDICATOR

[75] Inventor: John Ebenezer Sargunar, Glenrothes, Scotland

[73] Assignee: Burroughs Corporation, Detroit, Mich.

[22] Filed: Nov. 27, 1974

[21] Appl. No.: 527,895

[30] Foreign Application Priority Data
Mar. 15, 1974 United Kingdom............... 11609/74

[52] U.S. Cl. ................ 360/137; 360/121; 360/128
[51] Int. Cl.². G11B 5/22; G11B 5/28; G11B 5/115
[58] Field of Search ........... 360/137, 121, 128, 122, 360/129

[56] References Cited
UNITED STATES PATENTS

| | | | |
|---|---|---|---|
| 2,717,928 | 9/1955 | Nordyke | 360/128 |
| 2,769,036 | 10/1956 | Selsted | 360/128 |
| 3,486,220 | 12/1969 | Braun et al. | 360/121 |
| 3,495,049 | 2/1970 | Humphreys et al. | 360/122 |

Primary Examiner—Robert S. Tupper
Attorney, Agent, or Firm—Benjamin J. Barish; William B. Penn; Kevin R. Peterson

[57] ABSTRACT

Described is a magnetic transducer head assembly provided with a wear indicator to produce an indication when the head wear has proceeded to a predetermined point. For this purpose, the magnetic shield of the head includes a portion aligned with the pole faces of the head and which portion is subject to wear with the pole faces, such that the electrical continuity of the magnetic shield is interrupted upon the occurrence of a predetermined amount of wear of the pole faces. The magnetic shield further includes terminals for connection to an electrical device to test the electrical continuity of the shield portion, and thereby to provide an indication of the occurrence of the predetermined amount of wear.

8 Claims, 4 Drawing Figures

MAGNETIC TRANSDUCER HEAD HAVING AN INTEGRAL MAGNETIC SHIELD AND WEAR INDICATOR

BACKGROUND OF THE INVENTION

The present invention relates to magnetic transducer head assemblies such as are commonly used for recording, reproducing, or erasing information with respect to a magnetic record medium, such as a tape or disk.

Magnetic transducer head assemblies include a magnetic head, or more usually, a plurality of heads each having a magnetic core defining a pair of pole faces and a gap therebetween constituting the flux generating and receiving portion of the head. For optimum operation, the pole faces should be located as close as possible to the record medium; some heads operate while in actual contact with the record medium, which causes wear to occur in the pole faces. The dimensions of the gap are very critical, and the wear may unknowingly proceed to a point where the gap dimensions are so changed as to produce an intolerable degradation of the recording signal. This may result in the loss or distortion of valuable data. It may also result in a substantial down-time of the apparatus to replace the worn-out head by another, particularly if replacement heads are not readily available at the location where the apparatus is being used.

It has already been proposed (see for example U.S. Pat. No. 3,495,049) to provide magnetic transducer heads with wear indicators in the form of embedded colored beads or bars, electrical conductors, or electrical contacts, which provide an indication when the head wear has proceeded to a predetermined point. Such constructions, however, require significant changes in the design of the head, and/or manufacturing techniques for producing them in order to incorporate the wear indicator, and therefore add substantially to the cost of producing such heads.

SUMMARY OF THE INVENTION

The present invention provides a magnetic transducer head assembly which may use substantially the existing designs and manufacturing techniques for constructing the assemblies, involving but a simple and uncostly modification in the design to incorporate the wear indicator feature.

Briefly, this is attained by modifying the construction of the magnetic shield, commonly included in magnetic transducer head assemblies, for providing the wear indication.

More particularly, in accordance with the present invention, the magnetic transducer head assembly comprises a magnetic shield of electrically-conductive material which includes a portion aligned with the pole faces and is subject to wear therewith such that the electrical continuity of said shield portion is interrupted upon the occurrence of a predetermined amount of wear of the pole faces. The magnetic shield further includes terminals for connecting to an electrical device to test the electrical continuity of the said shield portion and thereby to provide an indication of the occurrence of the predetermined amount of wear.

According to a more specific aspect of the invention, the said magnetic shield portion includes a sheet of magnetic material extending in a plane laterally of the magnetic core. The sheet is of a configuration defining a pair of legs joined by a connecting web, the connecting web being aligned with the gap and the outer edge of the web being flush with the pair of pole faces. The connecting web is of a length spanning the pair of pole faces and the gap therebetween, and is of a width corresponding to the said predetermined amount of wear. The said pair of legs constitute or include the mentioned terminals for testing the electrical continuity of the connecting web.

According to a still more specific feature, the magnetic shield includes a plurality of mutually-insulated sheets of magnetic material laminated together, at least one of the sheets being continuous to provide a continuous shield for the magnetic head, and at least another one of the sheets being formed with a cut-out and defining the mentioned pair of legs and connecting web to provide the wear indication.

In the described embodiment, the head assembly includes at least a pair of magnetic heads each having a core defining a pair of pole faces and a gap therebetween, the magnetic shield being disposed between the pair of magnetic heads for preventing cross-talk therebetween.

It will be seen that by the present invention the wear indication feature may be incorporated in magnetic transducer heads of conventional existing designs by merely providing the cut-out, defining the connecting web and legs, on one of the laminated sheets in the magnetic shield. This can be done in a very simple and inexpensive manner, when making the laminated sheets of the shield, and therefore the normal design manufacturing techniques and assembly procedures commonly used in making head assemblies need not otherwise be changed.

Further features and advantages of the invention will be apparent from the description below.

BRIEF DESCRIPTION OF THE DRAWINGS

The invention is herein described with reference to a preferred embodiment thereof illustrated in the accompanying drawings, wherein.

DESCRIPTION OF THE PREFERRED EMBODIMENT

Figure 1:
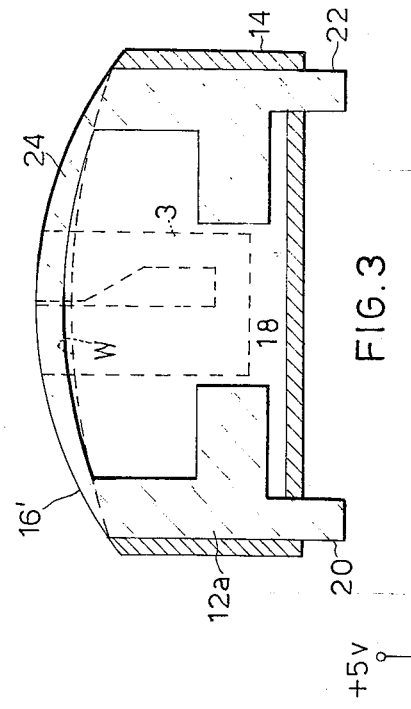
FIG. 1 is a top plan view of a three-head assembly constructed in accordance with the invention.
Figure 2:
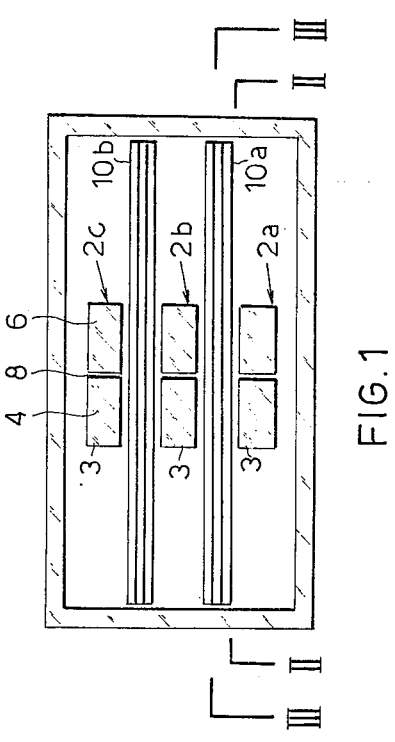
FIG. 2 is a sectional view along lines II — II of FIG. 1, and particularly illustrating the construction of a conventional magnetic sheet used in the magnetic shield lamination in such a head assembly.
Figure 3:
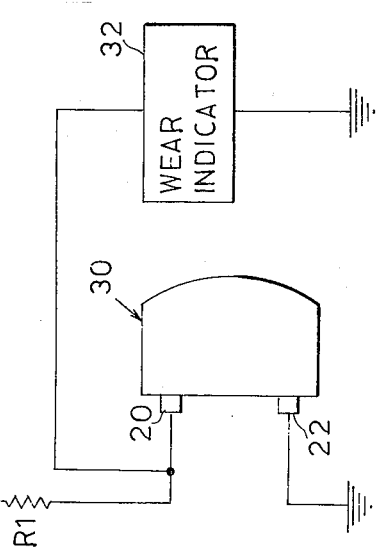
FIG. 3 is a sectional view along lines III — III of FIG. 1, and particularly illustrating the construction of another sheet in the magnetic shield, the latter sheet having been modified to incorporate the wear indicator feature of the invention.

The magnetic transducer head assembly illustrated in FIGS. 1–3 of the drawings is a multiple-head assembly commonly used in cassette type magnetic tape systems and in floppy-disk systems. In FIG. 1, a three-track head assembly is illustrated, the heads being designated 2a, 2b, 2c, but it will be appreciated that the invention is equally applicable with respect to assemblies having a greater or smaller number of heads.

Each head includes a magnetic core 3 of substantial C-shape defining a pair of pole faces 4, 6, and an air gap 8 therebetween. The cores are embedded in plastic and are provided with the appropriate electrical windings (not shown) for recording or reproducing information with respect to the magnetic recording medium. In this case, the recording medium is shown (see FIG. 2) as magnetic tape T which moves in the direction of the arrow with respect to gap 8 while the information is recorded thereon or reproduced or erased therefrom.

Each head 2a, 2b, 2c is separated from the next adjacent one by a magnetic shield composed of laminated sheets of mutually-insulated magnetic material. Each shield is disposed in a plane laterally of and substantially parallel to the respective core being shielded. Such shields are commonly provided to reduce cross-feed and cross-talk, and to confine the magnetic field within the respective gap area. Thus, as shown in FIG. 1, magnetic shield 10a is interposed between heads 2a and 2b, and magnetic shield 10b is interposed between heads 2b and 2c.

The individual sheets (e.g. 12, FIG. 2) of each shield 10a, 10b are commonly made of Mu-material, and they are usually insulated from each other by varnish coatings which also bond them together into a laminated sheet assembly.

The transducer head illustrated in the drawings further includes a casing 14 of non-magnetic material, such as brass or copper.

During use of the transducer head, as noted above, the abrading action of the recording medium (e.g. magnetic tape or magnetic disk) causes the pole faces 4, 6 of the core 3 to become worn. If this proceeds to the point where the critical dimensions of gap 8 between the pole faces are significantly altered, this will produce a sufficient degradation in the recorded or reproduced signal as to require the replacement of the magnetic head assembly. The broken line W in FIG. 2 illustrates the extent of wear permitted before replacement of the head is required.

In the conventional magnetic head assembly, each of the sheets 12 included in the laminated magnetic shield is of substantially rectangular shape so as to completely span the magnetic core 3 including its pole faces 4, 6, and gap 8. The conventional sheet 12 is seen in FIG. 2. As shown, the upper edge 16 of each sheet is flush with the upper surfaces of the pole faces 4, 6, and conform to their convex curvature so as to provide a smooth flush surface for the tape T.

According to the present invention, at least one of the sheets, designated 12a in FIG. 3, in one or both laminated sheet assemblies 10a, 10b is formed with a cut-out 18 so as to define a pair of legs 20, 22, jointed by a connecting web 24. The connecting web is aligned with the gap 8 of the magnetic core, and with the outer edge 16' of the connecting web 24 flush with the outer surface of the pole faces 4, 6. As particularly shown in FIG. 3, the length of the web 24 is sufficient to span the pair of pole faces 4, 6, and the gap 8 therebetween, and is of a width corresponding to the predetermined amount of wear permitted (as indicated by broken-line W) before replacement of the head is required.

Preferably, wear line W is determined to be at about 70% of the design life of the transducer head assembly, to provide adequate early warning and time to replace the head by the maintenance man during his next service call, or to order a replacement head from inventory.

It will be appreciated that web portion 24 of the specially-configured magnetic sheet 12a included in the shield assembly 10 is subjected to the same abrading action by the recording medium as the pole faces 4 and 6, and will therefore wear down with them. When the head has been worn to the predetermined line W requiring replacement, the electrical continuity of web portion 24 is interrupted.

Legs 20 and 22 of the specially-configured magnetic sheet 12a in the laminated shield assembly 10a, 10b are used as the terminals for connection to an electrical device to test the electrical continuity of web portion 24, and thereby to provide the indication of the occurrence of the predetermined amount of wear.

Figure 4:
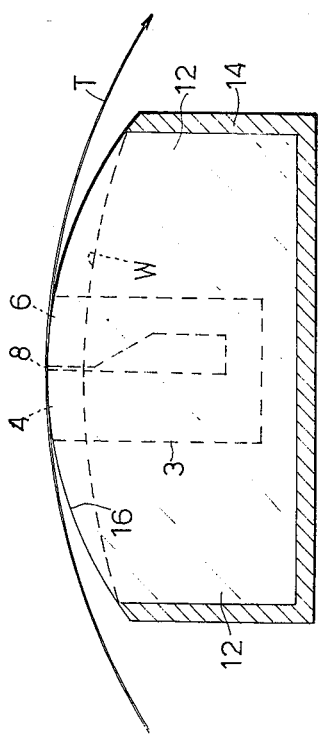
FIG. 4 is a diagram illustrating an indicator circuit that may be used with the head of FIGS. 1–3 to provide an early warning of a predetermined amount of wear thereof.

FIG. 4 illustrates an electrical indicator circuit that may be used. This circuit includes a voltage source (e.g. + 5 volts) applied via resistor R1 to terminal 20 of the head assembly 30, namely to its specially-configured magnetic sheet 12a, the other terminal 22 of that sheet being connected to ground. A connection is made from terminal 20 to a wear indicator 32, such as an indicator lamp.

So long as electrical continuity exists between terminal 20 and 22, as determined by the lack of interruption of interconnecting web 24, terminal 20 is substantially at ground voltage, and therefore no signal will be produced by wear indicator 32. However, as soon as interconnecting web 24 is interrupted, the + 5 volts from the source is applied to wear indicator 32 which indicates this fact, which means that the head assembly has been worn to the point requiring, or shortly requiring, replacement.

The user or maintenance man, therefore, may only inspect indicator 32 to determine whether the head requires replacement.

It will be appreciated that the invention enables magnetic transducer head assemblies to be constructed according to conventional designs and manufacturing techniques, requiring only that one of the magnetic sheets (12a) of the shield assembly be specially configured as described above, in order to include the wear indicator feature. The special configuration of that magnetic sheet can be easily done by a simple stamping operation, and therefore including this feature adds very little to the cost of making such magnetic transducer head assemblies.

The invention is preferably used in a multiple-head assembly, wherein the magnetic shield is interposed between two magnetic heads. If three or more heads are included, the specially-configured magnetic sheet (12a) need only be included in one of the laminated shield, although of course it could be included in more than one particularly if the head may be subject to different rates of wear on different surfaces thereof.

Further, while the invention has been described with respect to head assemblies in which the individual heads are embedded in plastic, it will be appreciated that it could advantageously be used in other head assembly constructions, such as those in which the heads are retained in slots formed in an aluminium body.

Many other variations, modifications and applications of the illustrated embodiment will be apparent.

What is claimed is:

1. A magnetic transducer head assembly comprising a magnetic head including a magnetic core defining a pair of pole faces and a gap therebetween, the pole faces being subject to wear during use with respect to a recording medium, and a magnetic shield of magnetic material disposed adjacent to said magnetic core for shielding same, said magnetic shield being electrically-conductive and including a pair of terminals electrically connected together only by a bridging portion aligned with the pole faces and subject to wear therewith so that the electrical continuity between said terminals is interrupted upon the interruption of said bridging portion occurring upon a predetermined amount of wear of the pole faces, said terminals being connectable to an electrical monitoring device for monitoring the electrical continuity of said shield bridging portion and thereby for providing an indication of the occurrence of the predetermined amount of wear.

2. A head assembly according to claim 1, wherein said magnetic shield bridging portion is included in a sheet of magnetic material extending in a plane laterally of the magnetic core, said sheet being of a configuration defining a pair of legs joined by a single connecting web, the connecting web being aligned with the gap with the outer edge of the web flush with the pair of pole faces, the connecting web being of a length spanning the pair of pole faces and the gap therebetween, and being of a width corresponding to said predetermined amount of wear, said pair of legs constituting said terminals for testing the electrical continuity of the connecting web.

3. A head assembly according to claim 2, wherein said magnetic shield includes a plurality of mutually-insulated sheets of magnetic material laminated together at least one of said sheets being continuous to provide a continuous shield for the magnetic head, and at least another one of said sheets being formed with a cut-out and defining said pair of legs and connecting web to provide the wear indication.

4. A head assembly according to claim 2, wherein the assembly includes at least a pair of magnetic heads each having a core defining a pair of pole faces and a gap therebetween, said magnetic shield being disposed between said pair of magnetic heads for preventing cross-talk therebetween.

5. A head assembly according to claim 1, in combination with means monitoring the electrical continuity of said magnetic shield bridging portion and providing an indication upon the interruption thereof.

6. A magnetic transducer head assembly comprising a magnetic head including a magnetic core defining a pair of pole faces and a gap therebetween, the pole faces being subject to wear during use with respect to a recording medium, and a magnetic shield of magnetic material for shielding the head, said magnetic shield being electrically-conductive and including a portion aligned with the pole faces and subject to wear therewith so that the electrical continuity of said shield portion is interrupted upon the occurrence of a predetermined amount of wear of the pole faces, said magnetic shield portion including a sheet of magnetic material extending in a plane laterally of the magnetic core, said sheet being of a configuration defining a pair of legs joined by a connecting web, the connecting web being aligned with the gap with the outer edge of the web flush with the pair of pole faces, the connecting web being of a length spanning the pair of pole faces and the gap therebetween, and being of a width corresponding to said predetermined amount of wear, said pair of legs constituting terminals for testing the electrical continuity of the connecting web.

7. A head assembly according to claim 6, wherein said magnetic shield includes a plurality of mutually-insulated sheets of magnetic material laminated together at least one of said sheets being continuous to provide a continuous shield for the magnetic head, and at least another one of said sheets being formed with a cut-out and defining said pair of legs and connecting web to provide the wear indication.

8. A head assembly according to claim 6, in combination with means monitoring the electrical continuity of said magnetic shield bridging portion and providing an indication upon the interruption thereof.

* * * * *